March 15, 1932.  F. D. ABBOTT  1,850,056
MATERIAL ABRASION TESTER
Filed April 13, 1929
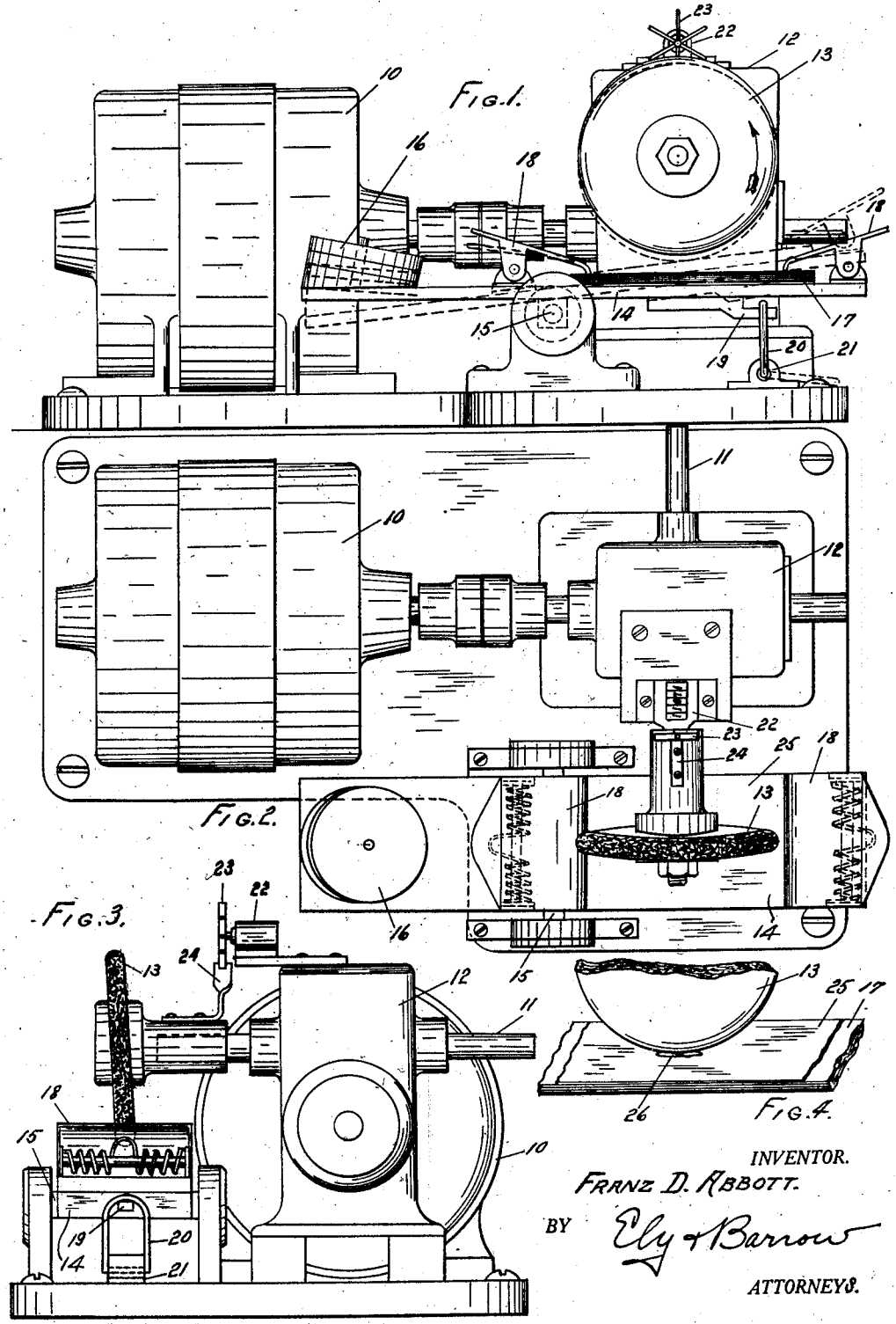
INVENTOR.
FRANZ D. ABBOTT.
BY
ATTORNEYS.

Patented Mar. 15, 1932

1,850,056

UNITED STATES PATENT OFFICE

FRANZ D. ABBOTT, OF AKRON, OHIO, ASSIGNOR TO THE FIRESTONE TIRE & RUBBER COMPANY, OF AKRON, OHIO, A CORPORATION OF OHIO

MATERIAL ABRASION TESTER

Application filed April 13, 1929. Serial No. 354,788.

This invention relates to an abrasion tester for determining the comparative wearing or abrasion-resisting qualities of various materials, for example papers, fabrics or the like.

The general purpose of the invention is to provide a simple economical apparatus for obtaining accurate comparative figures showing the comparative wearing or abrasion-resisting qualities of various materials and grades or kinds thereof.

More specifically the invention has for its object the provision of a rotary abrading element having an abrading action both longitudinally and transversely of a strip of material being tested whereby an effective test is secured and whereby when the element has worn a hole through the material, it will be apparent to the operator at once so that the number of revolutions of the abrading element and the time of the abrading action required to wear the material through under certain conditions, may be accurately determined.

A further object of the invention is to provide means for relatively pressing the abrading element and the material together under a known pressure whereby the conditions of each test or series of tests are accurately controllable.

The foregoing and other objects of the invention are attained in the abrasion tester illustrated in the accompanying drawings and described below. It is to be understood that the invention is not limited to the specific form thereof shown and described.

Of the accompanying drawings,

Figure 1 is a front elevation of a tester embodying the invention;

Figure 2 is a plan thereof;

Figure 3 is a right end elevation thereof; and

Figure 4 is a more or less diagrammatic view looking downwardly at the material being tested from the front side of the tester to illustrate the manner in which the degree of wear may be observed during the test.

Referring to the drawings, the testing unit may include a motor 10 or other source of power arranged to drive a shaft 11 through a suitable reduction 12, whereby shaft 11 will be driven comparatively slowly. Mounted eccentrically and also in a plane at a small angle to the vertical on shaft 11 is an abrasive wheel 13 against which the material is held under pressure for testing.

To hold the material against the wheel 13 during the test, a plate 14 extended under said wheel is pivoted intermediate its ends at 15 whereby one end may be pressed up into cooperation with the wheel 13 by weights 16 applied to the other end of the plate. A resilient pad 17 may be provided to support the material to be tested and suitable spring or other clips 18 may be arranged to clamp the material tested onto said pad.

Provision may be made to hold the material-supporting plate away from the abrasive wheel when material is being placed thereon or removed therefrom, a hook 19 being shown on the under side of the plate and a link 20 pivoted on a bracket 21 being arranged to be swung over said hook as shown in Figure 1.

Simple means for recording comparative tests may be provided in the form of a revolution counter 22 which may be mounted on the casing of reduction 12 with the star wheel 23 thereof arranged to be engaged and actuated at each revolution of the abrasive wheel 13 by an arm 24 secured to shaft 11.

In use a piece of paper or other material 25 to be tested is mounted on the pad 17 on plate 14 by being clamped thereon with clamps 18, the link 20 is then withdrawn from hook 19 to permit the plate to hold the material 25 against the wheel 13. The proper number of weights 16 are applied to plate 14 to secure the desired pressure of the material against the abrasive wheel.

The abrasive wheel is then driven, its circumferential movement imparting an abrading action longitudinally of the material and its wabbling movement due to the angular position thereof on shaft 11 causing a transverse abrading action, the eccentric mounting of the wheel causing the abrading action to be distributed over a somewhat increased area by reason of the shifting of the plate 14 on its pivotal support as the abrading surface moves upwardly and downwardly due to the eccentricity.

As appears in Figure 4, the movement of the wheel back and forth transversely of the material 25 exposes a large portion of the abraded area 26 at each revolution of the wheel, whereby the degree of wear due to the abrasive action is readily observable and whereby the test can be stopped immediately when the material is worn through to note the number of revolutions of the wheel 13 required to complete the test of any given sample under predetermined conditions.

It will appear from the foregoing that a simple but effective material tester has been provided by the invention. Obviously modification of the invention may be resorted to without departing from the spirit thereof or the scope of the appended claims.

What is claimed is:

1. A material abrasion tester including an eccentrically mounted rotary abrasive element, means for rotating said element, said element being mounted at an angle to the plane perpendicular to its axis of rotation, a plate adapted to support a piece of material to be tested, said plate being under the element, yielding means for urging the plate in cooperation with the element under a predetermined pressure, means for retaining the plate away from the element when desired, and means for counting the revolutions of said element.

2. A material abrasion tester including an eccentrically mounted rotary abrasive element, means for rotating said element, said element being mounted at an angle to the plane perpendicular to its axis of rotation, a plate adapted to support a piece of material to be tested, said plate being under the element, yielding means for urging the plate in cooperation with the element under a predetermined pressure, and means for counting the revolutions of said element.

3. A material abrasion tester including an eccentrically mounted rotary abrasive element, means for rotating said element, said element being mounted at an angle to the plane perpendicular to its axis of rotation, a plate adapted to support a piece of material to be tested, said plate being under the element, yielding means for urging the plate in cooperation with the element under a predetermined pressure, and means for retaining the plate away from the element when desired.

4. A material abrasion tester including an eccentrically mounted rotary abrasive element, means for rotating said element, said element being mounted at an angle to the plane perpendicular to its axis of rotation, a plate adapted to support a piece of material to be tested, said plate being under the element, and yielding means for urging the plate in cooperation with the element under a predetermined pressure.

5. A material abrasion tester including an eccentrically mounted rotary abrasive element, means for rotating said element, said element being mounted at an angle to the plane perpendicular to its axis of rotation, a plate adapted to support a piece of material to be tested, and yielding means for urging the plate in cooperation with the element under a predetermined pressure.

6. A material abrasion tester including an eccentrically mounted rotary abrasive element, means for rotating said element, said element being mounted at an angle to the plane perpendicular to its axis of rotation, a pivoted plate adapted to support a piece of material to be tested, and yielding means for urging the plate in cooperation with the element under a predetermined pressure.

In witness whereof, I have hereunto affixed my signature this 10th day of April, 1929.

FRANZ D. ABBOTT.